US012726999B2

(12) United States Patent
Zhang et al.

(10) Patent No.: US 12,726,999 B2
(45) Date of Patent: Sep. 1, 2026

(54) METHODS AND APPARATUSES FOR SMALL DATA TRANSMISSION IN RANDOM ACCESS

(71) Applicant: Lenovo (Beijing) Limited, Beijing (CN)

(72) Inventors: Yuantao Zhang, Beijing (CN); Ran Yue, Beijing (CN); Hongmei Liu, Beijing (CN); Zhi Yan, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 534 days.

(21) Appl. No.: 18/249,896

(22) PCT Filed: Oct. 22, 2020

(86) PCT No.: PCT/CN2020/122836

§ 371 (c)(1),
(2) Date: Apr. 20, 2023

(87) PCT Pub. No.: WO2022/082603

PCT Pub. Date: Apr. 28, 2022

(65) Prior Publication Data

US 2023/0397225 A1 Dec. 7, 2023

(51) Int. Cl.
*H04W 72/23* (2023.01)
*H04W 72/232* (2023.01)
(Continued)

(52) U.S. Cl.
CPC ..... *H04W 72/232* (2023.01); *H04W 74/0833* (2013.01); *H04W 76/27* (2018.02)

(58) Field of Classification Search
CPC .......... H04W 72/232; H04W 72/0446; H04W 72/04; H04W 76/11; H04W 76/27;
(Continued)

(56) References Cited

U.S. PATENT DOCUMENTS

2021/0112590 A1* 4/2021 Kim .................... H04W 74/002
2021/0410180 A1* 12/2021 Tsai ...................... H04L 1/1819
(Continued)

FOREIGN PATENT DOCUMENTS

CN 107026721 A 8/2017
CN 108418661 A 8/2018
WO 2020204637 A1 10/2020

OTHER PUBLICATIONS

Cozzo , "Additional enhancements for NB-IoT", 3GPP TSG RAN meeting #84, RP-191513, Newport Beach [retrieved Apr. 3, 2023]. Retrieved from the Internet <https://www.3gpp.org/ftp/tsg_ran/TSG_RAN/TSGR_84/Docs>., Jun. 2019, 29 Pages.
(Continued)

*Primary Examiner* — Wei Zhao
(74) *Attorney, Agent, or Firm* — FIG. 1 Patents

(57) ABSTRACT

Disclosed are methods and apparatuses for small data transmission in random access. One embodiment of the subject application provides a method performed by a user equipment, including monitoring at least one radio network temporary identifier for receiving a first downlink control information (DCI), and receiving the first DCI.

20 Claims, 5 Drawing Sheets

(51) Int. Cl.
*H04W 74/0833* (2024.01)
*H04W 76/27* (2018.01)

(58) Field of Classification Search
CPC .. H04W 72/23; H04W 72/044; H04L 1/1819; H04L 1/181
See application file for complete search history.

(56) References Cited

U.S. PATENT DOCUMENTS

| | | | | |
|---|---|---|---|---|
| 2023/0254928 | A1* | 8/2023 | Matsumura ........... | H04W 76/19 370/225 |
| 2024/0015759 | A1* | 1/2024 | Koskela ............... | H04B 7/0695 |
| 2025/0344258 | A1* | 11/2025 | Lin ....................... | H04W 76/30 |

OTHER PUBLICATIONS

Cozzo , et al., "RP-191576", 3GPP TSG RAN meeting #85, RP-191866, Newport Beach [retrieved Mar. 4, 2023]. Retrieved from the Internet <https://www.3gpp.org/ftp/TSG_RAN/TSG_RAN/TSGR_85/Docs>., Sep. 2019, 20 Pages.

PCT/CN2020/122836 , "International Preliminary Report on Patentability", PCT Application No. PCT/CN2020/122836, May 4, 2023, 5 pages.

PCT/CN2020/122836 , "International Search Report and Written Opinion", PCT Application No. PCT/CN2020/122836, Jul. 21, 2021, 6 pages.

* cited by examiner (a)

monitoring only the first RNTI monitoring only the second RNTI t t0 t2 t1 timer starts after TB0 being transmitted

DCI scrambled by the second RNTI timer expiry (b)

(a)

(b)

METHODS AND APPARATUSES FOR SMALL DATA TRANSMISSION IN RANDOM ACCESS

TECHNICAL FIELD

The present disclosure relates to methods and apparatuses for small data transmission (SDT) in random access (RA) procedure.

BACKGROUND OF THE INVENTION

In 3GPP (3rd Generation Partnership Project), a user equipment (UE) performing small data transmission (SDT) in an RRC_INACTIVE state is supported.

One way of SDT for RRC_INACTIVE UEs is the so-called multi-shot transmission, where the data signal might be multiplexed with RRCResumeRequest/RRCResumeRequest1 in an Msg3 as a transport block (TB) TB0 in a 4-step random access procedure, then the data signals are transmitted subsequently in form of transport block (TB1, TB2, . . . , TBn) under schedule of downlink control information (DCI), while the UE stays in the RRC_INACTIVE state during SDT, wherein n is a positive integer.

SUMMARY

In some embodiments, a method performed by a UE includes monitoring at least one radio network temporary identifier (RNTI) for receiving a first DCI, and receiving the first DCI.

In some embodiments, the method further includes transmitting a first TB based on the first DCI.

In some embodiments, transmitting the first TB further comprises including the second RNTI in the first TB in a form of a media access control (MAC) control element (CE).

In some embodiments, the at least one RNTI are a first RNTI and/or a second RNTI, the first RNTI is a temporary C RNTI (TC-RNTI), and the second RNTI is a specific RNTI (S-RNTI) or a shortI-RNTI.

In some embodiments, the UE is configured with the second RNTI when the UE is in an RRC_CONNECTED state.

In some embodiments, monitoring the at least one RNTI further includes starting a timer after transmitting a second TB, monitoring only the first RNTI before the timer expiries, and monitoring both the first RNTI and the second RNTI after the timer expires, wherein the second TB includes an RRCResumeRequest and a buffer status report (BSR).

In some embodiments, the timer is configured by the UE or a base station (BS), or is predefined.

In some embodiments, the method further includes monitoring only the second RNTI for receiving a second DCI in response to that the first DCI is scrambled by the second RNTI.

In some embodiments, the method further includes monitoring only the second RNTI for receiving a second DCI in response to that the first DCI includes at least the second RNTI.

In some embodiments, the first DCI is scrambled by the first RNTI.

In some embodiments, the method further includes stopping uplink data transmission and re-initiating RA in response to that the first DCI includes at least a third RNTI, and the third RNTI does not match the second RNTI.

In some embodiments, a method performed by a BS includes scrambling a first downlink control information (DCI) with a RNTI, and transmitting the first DCI to a UE.

In some embodiments, the at least one RNTI are a first RNTI and/or a second RNTI, the first RNTI is a TC-RNTI, and the second RNTI is an S-RNTI or a shortI-RNTI.

In some embodiments, the second RNTI is sent to the UE before the UE enters an RRC_INACTIVE state.

In some embodiments, scrambling the first DCI with the RNTI further includes scrambling the first DCI with the second RNTI in response to identifying a UE ID of the UE via a received TB.

In some embodiments, the method further includes receiving a first TB scheduled based on the first DCI.

In some embodiments, the method further includes scrambling a second DCI with the second RNTI in response to identifying a UE ID of the UE via a received TB, and transmitting the second DCI.

In some embodiments, the second RNTI is included in the first TB in a form of a MAC CE.

In some embodiments, in response to identifying the UE ID of the UE via a received TB, the first DCI at least includes the second RNTI.

In some embodiments, the first DCI is scrambled by the first RNTI.

In some embodiments, the DCI includes a preamble ID included in an Msg1 sent by the UE, an RA-RNTI which is associated with an RA procedure, and an RNTI not matching the second RNTI.

In some embodiments, an apparatus includes a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method. The method includes monitoring at least one RNTI for receiving a first DCI, and receiving the first DCI.

In some embodiments, an apparatus includes a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method. The method includes scrambling a first DCI with a RNTI, and transmitting the first DCI to a UE.

BRIEF DESCRIPTION OF THE DRAWINGS

Some example embodiments will now be described, by way of non-limiting examples, with reference to the accompanying drawings.

DETAILED DESCRIPTION

The detailed description of the appended drawings is intended as a description of the preferred embodiments of the present invention, and is not intended to represent the only form in which the present invention may be practiced. It should be understood that the same or equivalent functions may be accomplished by different embodiments that are intended to be encompassed within the spirit and scope of the present invention.

Reference will now be made in detail to some methods, embodiments, and apparatuses of the present disclosure, examples of which are illustrated in the accompanying drawings. To facilitate understanding, these methods, embodiments, and apparatuses are provided under specific network architecture and new service scenarios, such as 3rd Generation Partnership Project (3GPP) 5G and so on. It is contemplated that along with developments of network architectures and new service scenarios, all embodiments in the present application are also applicable to similar technical problems, and moreover, the terminologies recited in the present application may change, which should not affect the principle of the present application.

The present disclosure relates to SDT in an RA procedure when the UE is in an RRC_INACTIVE state.

Figure 1:
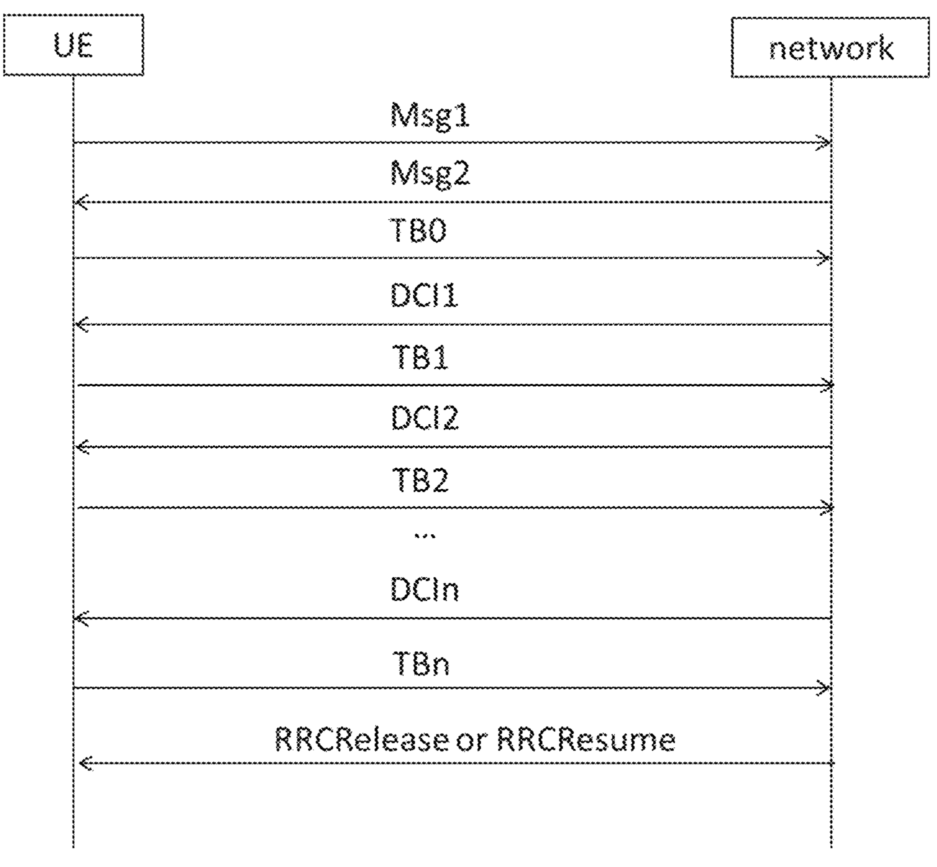
FIG. 1 illustrates an exemplary signaling sequence about SDT when UE in an RA IN_ACTIVE state according to some embodiments of the present disclosure.

FIG. 1 illustrates an example signaling sequence about performing SDT when the UE is in the RRC_INACTIVE state.

As shown in FIG. 1, the UE sends an Msg1 to a BS, wherein the Msg1 contains a preamble identifier (ID). The network sends an Msg2 to the UE, wherein the Msg2 contains a random access response (RAR) and is scheduled by a DCI, wherein the DCI is scrambled by a sequence deduced by a random access radio network temporary identifier (RA-RNTI). In the following descriptions, the DCI scrambled by a certain RNTI means the DCI is scrambled by a sequence deduced from the certain RNTI.

When performing SDT in the RRC_INACTIVE state, the UE multiplexes data with RRCResumeRequest or RRCResumeRequest1 in an Msg3 as TB0, and sends TB0 to the network. The RRCResumeRequest contains a short UE ID shortI-RNTI, while the RRCResumeRequest1 contains a long UE ID fullI-RNTI. The shortI-RNTI or fullI-RNTI are configured before UE transit to RRC_INACTIVE. If the SDT is a multi-shot transmission, the UE continues to send TB1, TB2, . . . , TBn scheduled by DCIs to the network, wherein n is a positive integer.

After the UE performs SDT, the BS may decide keeping the UE in the RRC_INACTIVE state (by sending RRCRelease) or transiting the UE to the RRC_CONNECTED state (by sending RRCResume).

In some embodiments of the present disclosure, the BS may be referred to as an access point, an access terminal, a base, a base unit, a macro cell, a Node-B, an evolved Node B (eNB), a gNB, a Home Node-B, a relay node, or a device, or described using other terminology used in the art.

The TB0 is scheduled by a UL-grant in an RAR included in an Msg2. The RRCResumeRequest or RRCResumeRequest1 contained in TB0 includes a UE ID.

Each of TB1, TB2, . . . , TBn transmission are scheduled by a corresponding DCI sent from the BS, e.g., the transmission of TB1 is scheduled by DCI1, the transmission of TB2 is scheduled by DCI2. The corresponding DCI is scrambled by a TC-RNTI.

As the RA is based on contention, it is possible that multiple UEs use the same preamble ID and transmit the preamble in the same RA channel (RACH) resource. In this case, these might receive a same RAR, and correspondingly, the TC-RNTIs of these UEs are the same. Since each of the subsequent TBs (TB1, TB2, . . . , TBn) are scheduled by a DCI scrambled by the TC-RNTI; accordingly, all the UEs use the DCI scrambled with the same TC-RNTI are transmitted at the same resources, and resource collision occurs; i.e., there is always mutual interference for the TBs transmitted from these UEs. Furthermore, if the subsequent TBs do not contain a UE ID, accordingly, when a preamble ID collision occurs, the TBs are scheduled by the same DCI, when the BS receives a TB, it is unknown where a detected TB (TB1, TB2, . . . , or TBn) is sent. For example, due to e.g., the fluctuation of channel status of the UEs, the TB1 may be from a UE, and the TB2 may be from another UE, yet it is unknown by the BS; therefore, it may finally lead to an incorrect packet in upper layer.

TB0 is scheduled by a UL-grant contained in a RAR contained in an Msg2, and the Msg2 is scrambled by an RA-RNTI. If multiple UEs transmit Msg1s at the same resource, their RA-RNTI are the same. Therefore, the multiple UEs receive the same Msg2. If these UEs use the same preamble ID, it means that these UEs use the same RAR in the same Msg2. Accordingly, these UEs use the same UL-grant for scheduling their TB0s. Therefore, TB0s of these UEs are sent at the same resource and collided with each other.

Figure 2:
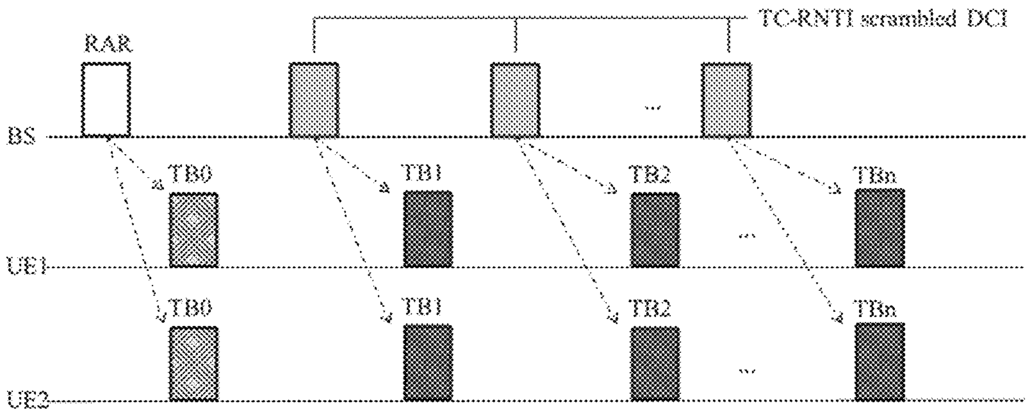
FIG. 2 illustrates an exemplary SDT time line according to some embodiments of the present disclosure.

FIG. 2 illustrates an example on the contention-based data transmission for two UEs in a random access procedure.

As shown in FIG. 2, UE1 and UE2 transmit the same preamble ID in their Msg1 at the same resource; accordingly, they receive a same RAR from the BS, and they follow the same scheduling information in the same RAR in the same Msg2 for TB0 transmitting. Furthermore, with the TC-RNTI in the received RAR, the UEs receive the same DCI scrambled by the same TC-RNTI for the data scheduling, i.e., every DCI scrambled by the TC-RNTI are received by UE1 and UE2. In other words, the UEs may transmit data at the same resource due to that they follow the same scheduling information contained in the same DCI for subsequent TB (e.g., TB1, TB2, . . . , and TBn) transmission. In other words, the subsequent TBs of UE1 and UE2 are mutually collided since they are transmitted simultaneously in the same resource based on the same scheduling information; similarly, the subsequent TBs of UE1 and UE2 are mutually collided. In such case, the mutual interference between the UE1 and UE2 may be inevitable. Furthermore, when the BS successfully receives a TB (TB1, TB2, . . . , or TBn), the BS cannot identify the UE ID from which the TB is sent, and the BS may consider that these received TBs are from the same UE.

The present disclosure introduces an S-RNTI for scrambling subsequent DCIs (DCI1, DCI2, . . . , and DCIn) for scheduling subsequent TBs (TB1, TB2, . . . , TBn) transmission of a specific UE. The use of the S-RNTI may reduce the interferences from the UEs using the same preamble ID (and transmitting the preamble ID at the same resource), avoid negative impact caused by preamble collisions, and save the power of the UEs. These advantages are described below in conjunction with various methods, embodiments, and examples.

Figure 3:
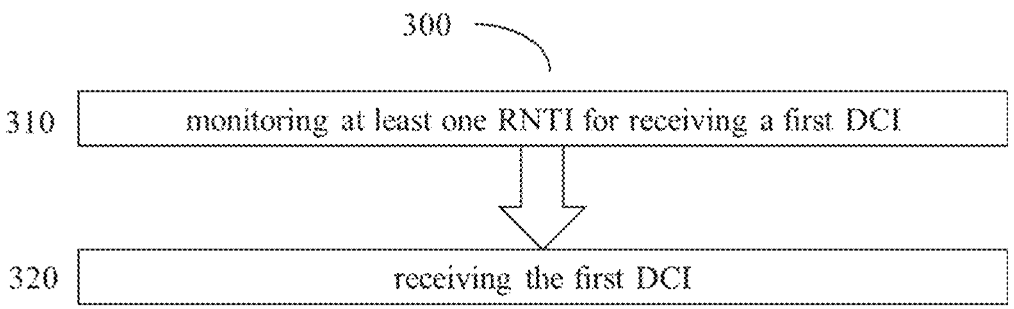
FIG. 3 illustrates an exemplary method according to some embodiments of the present disclosure.

FIG. 3 shows an exemplarily method 300 performed by a UE according to some embodiments of the present disclosure.

As shown in FIG. 3, the method 300 at least includes an operation 310 and an operation 320. The operation 310 illustrates monitoring at least one RNTI for receiving a DCI, and the operation 320 illustrates receiving the DCI.

In some embodiments, the at least one RNTI is a first RNTI and/or a second RNTI.

In some embodiments, the first RNTI is a temporary C RNTI (TC-RNTI), and the second RNTI is an S-RNTI or a shortI-RNTI.

In some embodiments, the BS sends the second RNTI to the UE before the UE enters the RRC_INACTIVE state or when the UE is in an RRC_CONNECTED state.

In some embodiments, at the beginning, the BS sends DCIs scrambled by the first RNTI for scheduling the UE to transmit data. When the BS identifies the UE successfully via a TB, the BS may scramble subsequent DCIs for scheduling subsequent data transmitting only by the second RNTI. According to the present disclosure, the BS identifies the UE successfully means the BS identifies the UE ID of the UE successfully. Furthermore, according to the present disclosure, the BS may identify the UE ID via a received TB0 from the UE. Moreover, if the UE put the second RNTI in TBn (n is a positive integer), the BS may identify the UE ID via the second RNTI and the mapping between the second RNTI and the UE ID.

In some embodiments, when the BS identifies the UE ID of the UE (e.g., the BS recovers UE ID via TB0, or get UE ID from TBm, wherein m is a positive integer greater than 1), the BS scrambles the subsequent DCIs by the S-RNTI. From UE point of view, the UE may detect both S-RNTI and TC-RNTI for a DCI for data scheduling. If the UE detects a DCI scrambled by the S-RNTI of the UE, the UE may monitor only the DCIs only scrambled by the S-RNTI for receiving the subsequent TBs; and other UEs using the same preamble ID (and transmitting the preamble ID at the same resource) fail in RA. The UE may receive the DCI and transmit a TB (TB1, TB2, . . . , or TBn) based on the DCI. And the UE may monitor only the S-RNTI and receives the DCIs scrambled by the S-RNTI for subsequent data transmitting.

In some embodiments, the UE may send TB0 scheduled by a UL-grant before monitoring the DCI. When the BS identifies the UE ID, the BS may send DCIs scrambled by the S-RNTI. Later when the UE detects a DCI scrambled by the S-RNTI, it may monitor only the DCIs scrambled by the S-RNTI, and the other UEs using the same preamble ID fail in RA. The BS schedules the data transmission from the UE, and ignores the other UEs using the same preamble ID. Accordingly, the interference from these UEs are not existed any longer. The UE need only monitor the S-RNTI for receiving the subsequent DCIs for scheduling subsequent data transmitting.

In some embodiments, since the BS needs some time to recover the UE ID in the higher layer (e.g., the BS need some time to recover UE ID from a received TB0), the BS may schedule the data transmission before the UE ID is recovered. In order to reduce the transmission latency and correspondingly save the UE power in data transmission, the BS may scramble the DCIs with the TC-RNTI.

The UE may include the second RNTI (e.g., S-RNTI) in the TB in a form of a MAC CE for the BS to do further identification.

In some embodiments, the UE may include the second RNTI in a TB scheduled by a DCI scrambled by the first RNTI.

In some embodiments, the UE may include the second RNTI in a TB scheduled by a DCI scrambled by the second RNTI. One advantage is that after the BS identifies the UE ID via a TB, it may check whether any subsequent TBs (TB1, TB2, . . . , or TBn) is missed according to the S-RNTI contained in the subsequent TBs.

In some embodiments, the method 300 further includes transmitting a TB0 before monitoring the at least one RNTI, wherein the TB0 at least includes an RRCResumeRequest (or an RRCResumeRequest 1) and a BSR.

In some embodiments, the method 300 further comprises transmitting a TB based on a DCI. The DCI is for scheduling the TB. In some embodiments, the TB is referred to TB1, TB2, . . . , or TBn, and the DCI may be DCI1, DCI2, or DCIn, as shown in FIG. 1.

In some embodiments, before monitoring the DCI, the UE sends TB0 (including the RRCResumeRequest (or the RRCResumeRequest1) and the BSR) to the BS first. As the BS needs time to get the UE ID contained in the TB0, and before the UE ID is recovered, the BS may scramble the DCIs with the TC-RNTI, the UE may start a timer after transmitting TB0. Before the timer expiries, the UE monitors only the first RNTI and receives the DCIs scrambled by the first RNTI, the UE does not monitor the second RNTI and receive the DCIs scrambled by the second RNTI; this may help to save energy of the UE. After the timer expiries, the UE monitors both the first RNTI and the second RNTI, this is because the UE cannot determine whether the BS identifies the UE ID of the UE successfully. If the UE detects a DCI scrambled by the second RNTI, it means the BS identifies the UE ID of the UE successfully, the UE may monitor only the second RNTI for subsequent DCI reception and subsequent data transmitting. If the UE only detects DCIs scrambled by the first RNTI, the UE may put the S-RNTI in the subsequent TBs for the BS to do further identification or check missed data.

In some embodiments, the timer is configured by the UE or the BS, or is predefined.

Figure 4:
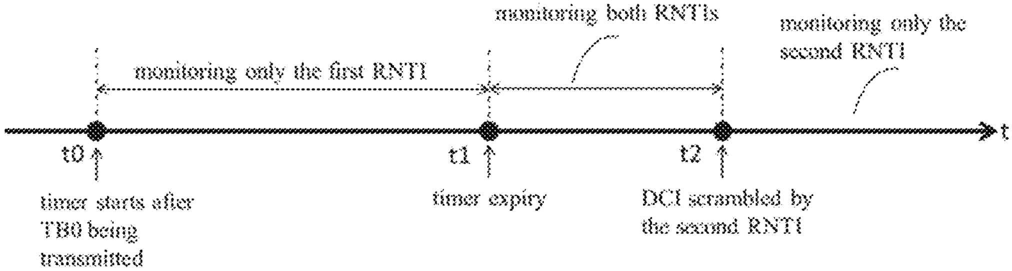
FIG. 4 (including (a) and (b)) illustrates several examples of setting a timer for monitoring RNTIs according to some embodiments of the present disclosure.

FIG. 4 illustrates several examples of setting a timer for monitoring RNTIs.

As shown in FIG. 4(*a*), at t0, the UE sends TB0 and starts a timer; at t1, the timer expiries; and at time t2 later than t1, the UE detects a DCI scrambled by the second RNTI. In this example, during the period from t0 to t1, the UE monitors only the first RNTI and receives DCIs scrambled by the first RNTI for the data scheduling; during the period from t1 to t2, the UE monitors both the first RNTI and the second RNTI for receiving DCIs for data scheduling; and after t2, the UE monitors only the second RNTI.

In some embodiments, the UE put its second RNTI in every TBn to be transmitted, where n is a positive integer.

As shown in FIG. 4(*b*), at to, the UE sends TB0 and starts a timer; at t1, the timer expiries; and at time t2 before t1, the UE detects a DCI scrambled by the second RNTI. In this example, during the period from t0 to t2, the UE monitors only the first RNTI and receives the DCIs scrambled by the first RNTI; and after t2, the UE monitors only the second RNTI and receives the DCIs scrambled by the second RNTI. In some embodiments, the UE may stop the timer in advance upon receiving the DCI at time t2.

In some embodiments, the UE put its second RNTI in every TBn to be transmitted, where n is a positive integer.

As mentioned before, when the BS identifies the UE successfully, the BS may scramble the subsequent DCIs with the second RNTI, and when the UE receives such a DCI, the UE may continue to perform data transmission in RA. Besides, there is another way for the UE to know earlier that the BS identifies the UE successfully; that is to send a dedicated DCI, which at least includes the second RNTI. In some embodiments, the DCI might also contain the RA-RNTI, and the preamble ID sent by the UE.

Upon receiving the dedicated DCI, the UE does not need to monitor the first RNTI any longer, which can reduce the power consumption of the UE. Furthermore, when other UEs use the same preamble ID and/or the same RA-RNTI receive the dedicated DCI, they get to know that they fail in RA, and they may stop futile data transmission and re-initiate RA, which can reduce power consumption for futile data transmission.

Please refer to an example of the dedicated DCI as shown in Table 1. In this example, the second RNTI is the S-RNTI, which occupies 16 bits. The dedicated DCI at least includes the second RNTI, the preamble ID and the RA-RNTI associated with RA.

TABLE 1

| Field | Number of bits |
|---|---|
| Preamble ID | 8 bits |
| S-RNTI | 16 bits |
| RA-RNTI | 16 bit |

In some embodiments, the DCI in the method 300 is the dedicated DCI, and the method 300 further includes monitoring only the second RNTI and receiving the subsequent DCIs scrambled by the second RNTI. Based on scheduling information of these DCIs, the UE performs data transmission.

In some embodiments, the dedicated DCI is scrambled by the first RNTI, so that all the UEs receiving a same RAR may receive the dedicated DCI.

Figure 5:
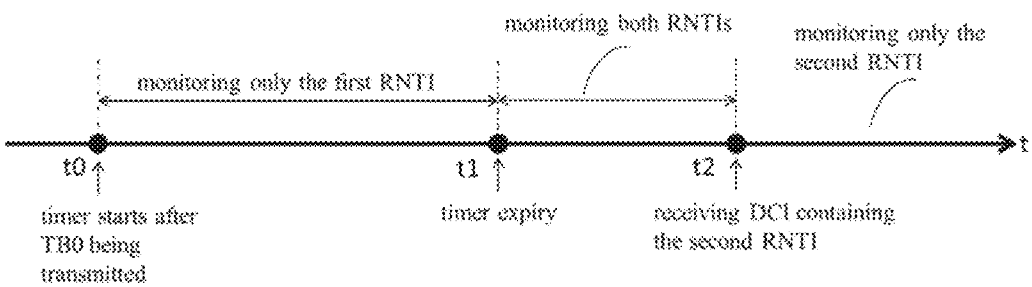
FIG. 5 (including (a) and (b)) illustrates several examples of setting a timer for monitoring RNTIs according to some embodiments of the present disclosure.
Figure 5:
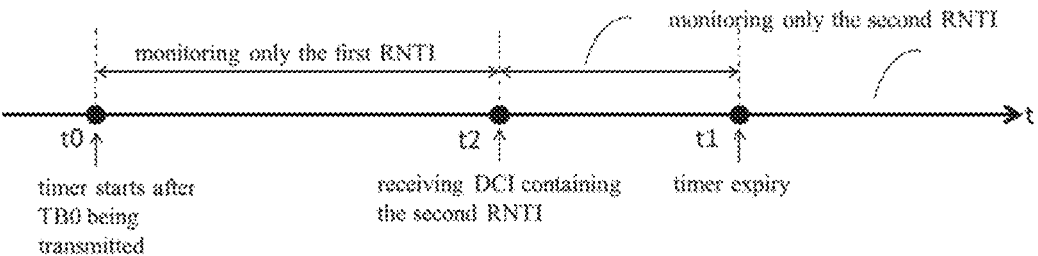

FIG. 5 illustrates several examples of setting a timer for monitoring RNTIs.

As shown in FIG. 5(*a*), at t0, the UE sends TB0 and starts a timer; at t1, the timer expiries; and at time t2 later than t1, the UE detects a dedicated DCI at least containing the second RNTI, the preamble ID, and the RA-RNTI associated with RA. In this example, during the period from t0 to t2, the UE monitors only the first RNTI and receives the DCIs scrambled by the first RNTI; and after t2, the UE monitors only the second RNTI and receives the DCIs scrambled by the second RNTI.

In some embodiments, the UE put its second RNTI in every TBn to be transmitted, where n is a positive integer.

As shown in FIG. 5(*b*), at t0, the UE sends TB0 and starts a timer; at t1, the timer expiries; and at time t2 before t1, the UE detects a dedicated DCI at least containing the second RNTI, the preamble ID, and the RA-RNTI associated with RA. In this example, during the period from t0 to t2, the UE monitors only the first RNTI and receives the DCIs scrambled by the first RNTI; and after t2, the UE monitors only the second RNTI and receives the DCIs scrambled by the second RNTI. In some embodiments, the UE put its second RNTI in every TBn to be transmitted, where n is a positive integer.

In some cases, UE1 and UE2 transmit the same preamble ID at the same RACH resource.

In some embodiments, if the BS firstly identifies UE2 ID via UE2 S-RNTI in UE2 TB1, the BS may scramble the subsequent DCIs with UE2 S-RNTI and re-schedule the re-transmission of the missed UE2 TBs (e.g., UE2 TB0, UE2 TB2).

In some embodiments, if the BS identifies UE1 ID and UE2 ID at the same time, for example, the BS identifies UE1 ID from UE1 TB0 and UE2 ID from UE2 TB1 at the same time, the BS may select UE1 S-RNTI or UE2 S-RNTI for scrambling the subsequent DCIs. The UE whose S-RNTI is not selected by the BS may stop the data transmission and re-initiate RA, and the UE whose S-RNTI is selected by the BS may continue the data transmitting in RA and its TBs missed by the BS may be re-transmitted.

In some embodiments, if the BS successfully identifies the UE1 ID and UE2 ID via TBs but not the TB0, the BS may be configured to be wait for a period. If during the period, the BS successfully recovers one UE ID of UE1 or UE2 via UE1 TB0 or UE2 TB0, e.g., the BS successfully recovers UE1 ID via UE1 TB0, the BS begin to schedule data transmitting of UE1, and UE2 fails in RA.

Figure 6:
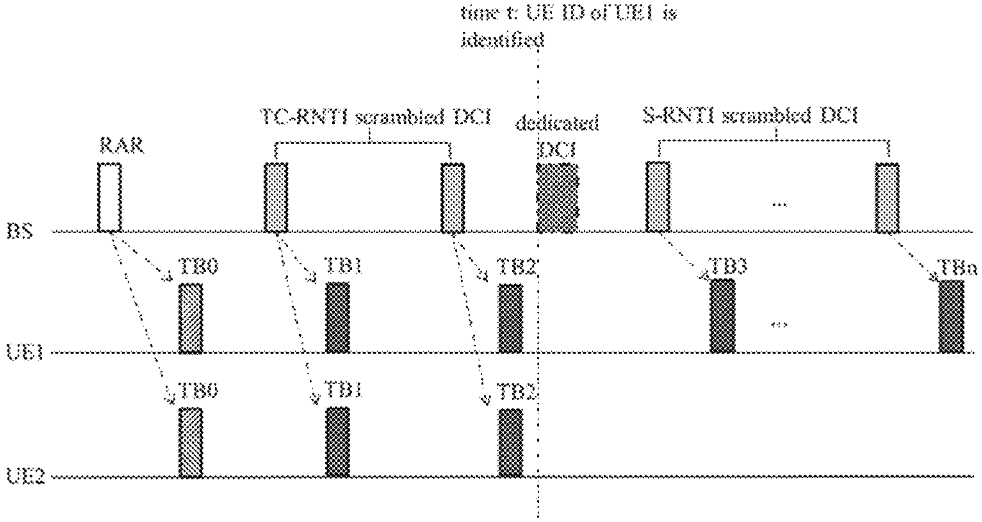
FIG. 6 illustrates an example time line according to some embodiments of the present disclosure.
Figure 7:
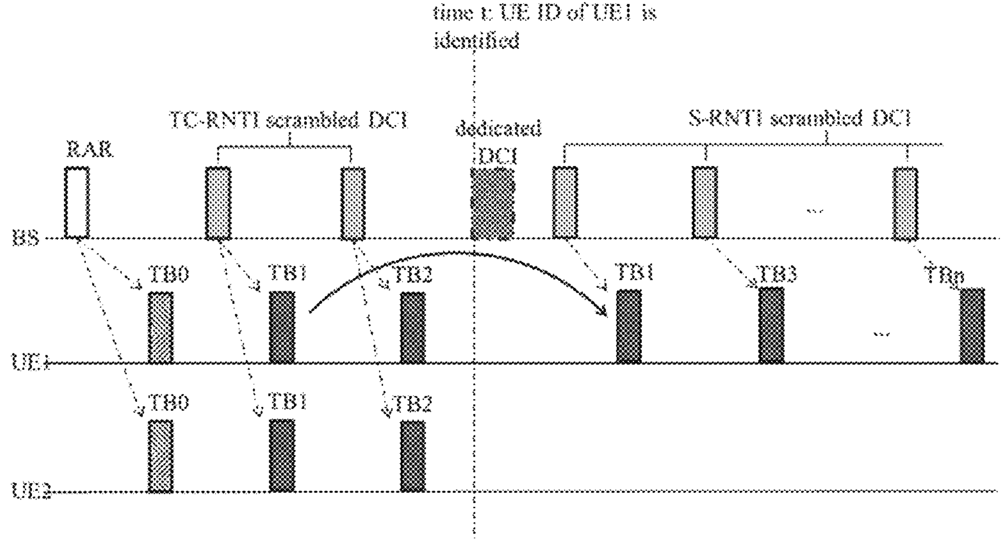
FIG. 7 illustrates an example time line according to some embodiments of the present disclosure.

FIG. 6 and FIG. 7 are some exemplary time lines according to some embodiments of the present disclosure. The precondition is that UE1 and UE2 are configured with their own dedicated S-RNTIs, but use the same preamble ID and send Msg1 at the same resource; therefore they received the same TC-RNTI in the same RAR. Accordingly, they receive the same UL-grant in the RAR in the same Msg2 for scheduling TB0, and receive the same DCIs scrambled by the same TC-RNTI for scheduling the subsequent TB transmitting. In this case, UE1 and UE2 send their TB0 at the same resource, send their TB1 at the same resource, and send their TB2 at the same resource; accordingly, the two TB0 are mutually collided, the two TB1 are mutually collided, and the two TB2 are mutually collided. At the beginning, UE1 monitors both the DCIs scrambled by the TC-RNTI and the DCIs scrambled by the UE1 S-RNTI, and UE2 monitors both the DCIs scrambled by the TC-RNTI and the DCIs scrambled by the UE2 S-RNTI; furthermore, UE1 may put its UE1 S-RNTI in the TBs to be transmitted, and UE2 may put its UE2 S-RNTI in the TBs to be transmitted.

Referring to FIG. 6, after UE 1 and UE2 sending their TB0, TB1 and TB2, at time t, the BS identifies UE1 ID successfully via UE1 TB0 or UE1 TB2. Then the BS begins to scramble the subsequent DCIs with the UE1 S-RNTI after time t. Once UE1 detect a DCI scrambled by the UE1 S-RNTI, it begins to monitor the DCIs scrambled by the UE1 S-RNTI. Based on these subsequent DCIs scrambled by UE1 S-RNTI. UE1 transmits subsequent TB3-TBn to the BS after time t. Since UE2 cannot receive the subsequent DCIs scrambled by the UE1 S-RNTI, UE2 cannot transmit subsequent TBs.

In one embodiment, the BS may further send a dedicated DCI at time t when it identifies UE1 ID of UE1 successfully, wherein the dedicated DCI includes the dedicated S-RNTI of UE1, the RA-RNTI, and the preamble ID associated with UE1 RA. This dedicated DCI is scrambled by the TC-RNTI; therefore, both UE1 and UE2 may receive the dedicated DCI. When UE1 receives the dedicated DCI, it begins to monitor the subsequent DCI scrambled the dedicated S-RNTI for UE1. When UE2 receives the dedicated DCI, it indicates that its TB0 is failed to be received by the BS, i.e., its RA fails, then UE2 stops data transmission and re-initiate RA. After the time t, there is no interference from UE2 upon UE1 any longer; and UE2 may save energy with early termination of data transmission according to the dedicated DCI.

In some embodiments, from the beginning, both UE1 and UE2 put their S-RNTIs in the TBs (not including TB0); and after time t, the UE1 continues to put UE1 S-RNTI in the subsequent TBs (TB3-TBn).

Referring to FIG. 7, before time t, UE1 and UE 2 transmit their TB1 and TB2 scheduled by corresponding DCIs scrambled by the TC-RNTI, wherein UE1 and UE2 put their own S-RNTI in their TBs (including TB1 and TB2). At time t, the BS identifies UE1 ID of UE1 successfully, the BS continues to perform data transmission with UE1. In an example, according to the S-RNTI contained in the TBs, the BS finds that UE1 TB2 is received successfully, yet UE1 TB1 is failed to be received due to e.g., the fluctuation of channel status of the UEs. The BS may re-schedule the transmission of UE1 TB1. The BS sends a DCI for re-schedule UE1 TB1, wherein the DCI is scrambled by the UE1 S-RNTI. Based on this DCI, UE1 re-transmits UE1 TB1. In other words, the DCI for scheduling an initial transmission for TB1 and the DCI for scheduling a retransmission for TB1 are scrambled with different RNTIs.

Figure 8:
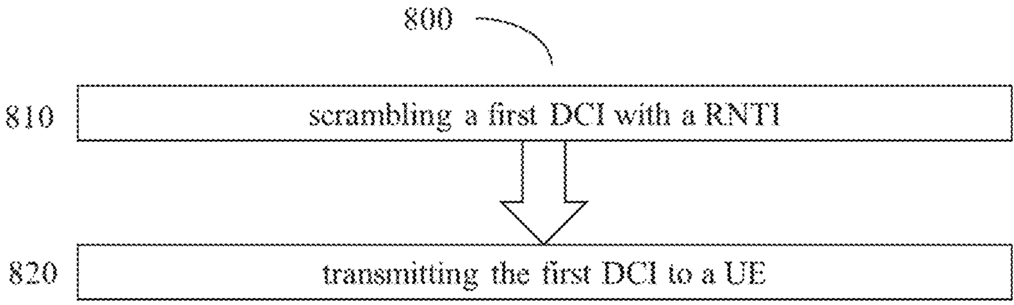
FIG. 8 illustrates an exemplary method according to some embodiments of the present disclosure.

FIG. 8 shows an exemplarily method 800 performed by a BS according to embodiments of the present disclosure, wherein the method 800 corresponds to the method 300 performed by the UE.

As shown in FIG. 8, the method 800 at least includes an operation 810 and an operation 820. The operation 810 illustrates scrambling a DCI with a RNTI, and the operation 820 illustrates transmitting the DCI to a UE.

In some embodiments, wherein the at least one RNTI are a first RNTI and/or a second RNTI, the first RNTI is a TC-RNTI, and the second RNTI is an S-RNTI.

In some embodiments, the BS sends the second RNTI to the UE before the UE enters the RRC_INACTIVE state or when the UE is in the RRC_CONNECTED state. In some embodiments, the BS also stores the second RNTI of the UE.

At the beginning, the BS sends DCIs scrambled by the DCI for scheduling the UE to transmit data, wherein the scheduling information in the DCI is based on the preamble ID and the RA-RNTI associated with the RA. When the BS identifies the UE successfully via a TB, the BS may send subsequent DCIs scrambled by the second RNTI for scheduling subsequent data transmitting from the UE.

In some embodiments, the BS may receive TB0 before sending the DCI, wherein TB0 may include an RRCResumeRequest (or an RRCResumeRequest1) and a BSR.

The BS identifies the UE ID successfully, the BS may send subsequent DCIs scrambled by the second RNTI for scheduling subsequent data transmitting from the UE.

In some embodiments, the TBs received from the UE (not including TB0) always contain the S-RNTI.

In some embodiments, after identify the UE ID of the UE, the BS may check whether there are missed TBs (not including TB0) from the UE according to the S-RNTI contained in the TBs. If there is any TB missed to be received, the BS may re-schedule the transmission of the TB by sending a DCI scrambled by the S-RNTI to the UE.

In some embodiment, the DCI in the method 800 is a dedicated DCI scrambled by the TC-RNTI. The dedicated DCI at least includes the second RNTI, the preamble ID, and the RA-RNTI associated with RA. When the BS identifies the UE ID successfully, it may send such a dedicated DCI. All the UEs uses the same preamble ID and the same RA-RNTI may receive the dedicated DCI. When the UE receives the dedicated DCI, it continues to perform data transmission. When the other UEs using the same preamble ID and the same RA-RNTI receive the dedicated DCI, as the S-RNTI contained in the dedicated DCI does not match their own DCIs, they may stop the futile data transmission and re-initiate RA.

According to the various embodiments, examples, and methods mentioned previously, the negative effect of the preamble collision may be reduced, the mutual interference between the UEs using the same preamble may be reduced, and the UEs fail in RA may stop data transmission earlier for power saving.

The spirit of the present disclosure is not limited to the various embodiments, examples, and methods mentioned previously. On the basis of not violating the inventive spirit of the present invention, the above various embodiments in the present invention can be reasonably extended.

Figure 9:
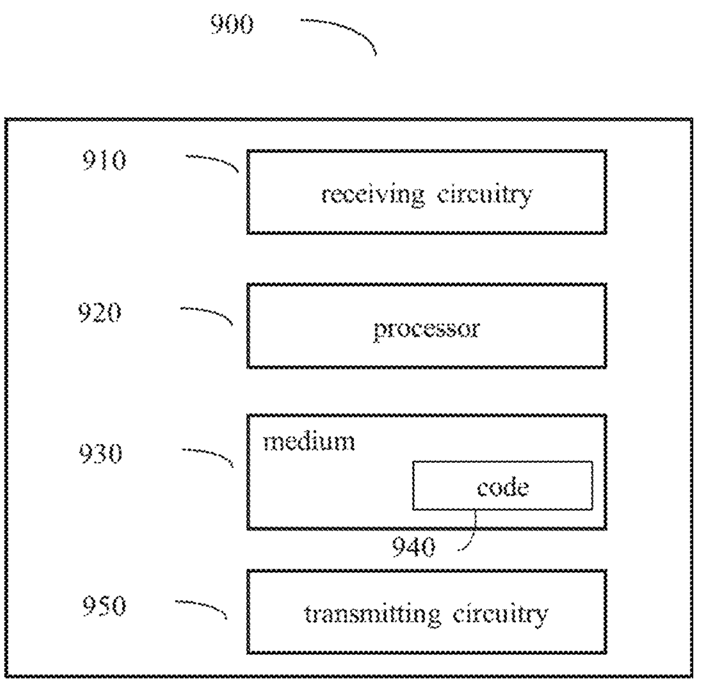
FIG. 9 illustrates an example method according to some embodiments of the present disclosure.

FIG. 9 illustrates an example apparatus 900 for performing the method 300, which, for example, may be at least a part of a UE (e.g. the first UE).

As shown in FIG. 9, the apparatus 900 may include at least one receiving circuitry 910, at least one processor 920, at least one non-transitory computer-readable medium 930 with computer-executable 940 stored thereon, and at least one transmitting circuitry 950. The at least one medium 930 and the computer program code 940 may be configured to, with the at least one processor 920, cause the apparatus 900 at least to perform at least the example method 300 described above, wherein, for example, the apparatus 900 may be the UE in the example method 300.

Figure 10:
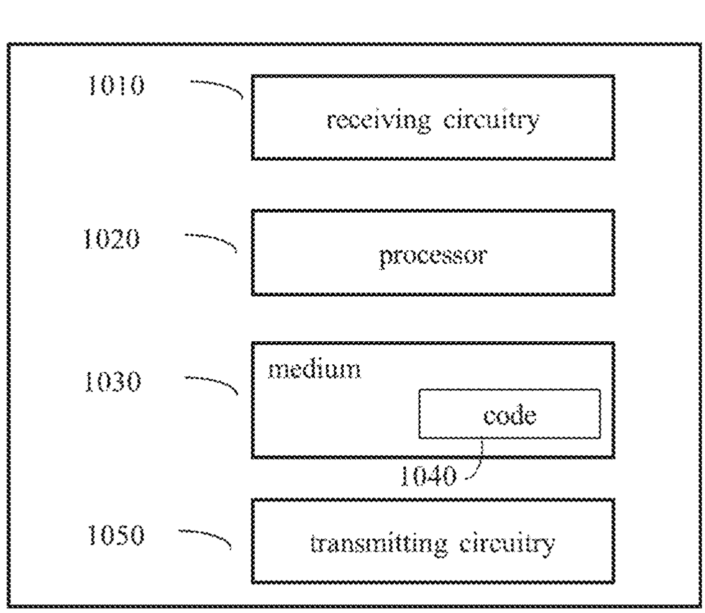
FIG. 10 illustrates an example apparatus according to some embodiments of the present disclosure.

FIG. 10 illustrates an example apparatus 1000 for performing the method 800, which, for example, may be at least a part of a BS.

As shown in FIG. 10, the apparatus 1000 may include at least one receiving circuitry 1010, at least one processor 1020, at least one non-transitory computer-readable medium 1030 with computer-executable 1040 stored thereon, and at least one transmitting circuitry 1050. The at least one medium 1030 and the computer program code 1040 may be configured to, with the at least one processor 1020, cause the apparatus 1000 at least to perform at least the example method 800 described above, wherein, for example, the apparatus 1000 may be the BS in the example method 800.

In various example embodiments, the at least one processor 920 or 1020 may include, but not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, the at least one processor 920 or 1020 may also include at least one other circuitry or element not shown in FIG. 9 or 10.

In various example embodiments, the at least one medium 930 or 1030 may include at least one storage medium in various forms, such as a volatile memory and/or a non-volatile memory. The volatile memory may include, but not limited to, for example, an RAM, a cache, and so on. The non-volatile memory may include, but not limited to, for example, an ROM, a hard disk, a flash memory, and so on. Further, the at least medium 930 or 1030 may include, but are not limited to, an electric, a magnetic, an optical, an electromagnetic, an infrared, or a semiconductor system, apparatus, or device or any combination of the above.

Further, in various example embodiments, the example apparatus 900 or 1000 may also include at least one other circuitry, element, and interface, for example antenna element, and the like.

In various example embodiments, the circuitries, parts, elements, and interfaces in the example apparatus 900 or 1000, including the at least one processor 920 or 1020 and the at least one medium 930 or 1030, may be coupled together via any suitable connections including, but not limited to, buses, crossbars, wiring and/or wireless lines, in any suitable ways, for example electrically, magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), comprising:

monitoring at least one radio network temporary identifier (RNTI) for receiving a first downlink control information (DCI), wherein the monitoring comprises:

starting a timer after transmitting a first transport block (TB);

monitoring only a first RNTI before the timer expires; and monitoring both the first RNTI and a second RNTI after the timer expires, wherein the first TB includes an RRCResumeRequest or an RRCResumeRequest1, and a buffer status report (BSR); and receiving the first DCI.

2. The method of claim 1, further comprising transmitting the first TB based on the first DCI.

3. The method of claim 1, wherein transmitting the first TB further comprises including the first RNTI in the first TB in a form of a media access control (MAC) control element (CE).

4. The method of claim 1, wherein the first RNTI is a temporary C-RNTI (TC-RNTI), and the second RNTI is a specific RNTI (S-RNTI) or a short Inactive-RNTI (shortI-RNTI).

5. The method of claim 1, wherein the UE is configured with the first RNTI when the UE is in an RRC_CONNECTED state.

6. A base station (BS) for wireless communication, comprising:

at least one memory; and at least one processor coupled with the at least one memory and configured to cause the BS to:

scramble a first downlink control information (DCI) with a radio network temporary identifier (RNTI);

configure a timer;

receive a first transport block (TB) from a user equipment (UE), wherein the first TB includes an RRCResumeRequest or an RRCResumeRequest1 and a buffer status report (BSR), and wherein the timer is started after reception of the first TB and only the first RNTI is monitored before the timer expires;

transmit the first DCI to the UE; and scramble a second DCI with a second RNTI based on the first TB, wherein the first RNTI and the second RNTI are monitored after the timer expires.

7. The BS of claim 6, wherein the first RNTI is a temporary C-RNTI (TC-RNTI), and the second RNTI is a specific RNTI (S-RNTI) or a short Inactive-RNTI (shortI-RNTI).

8. The BS of claim 6, wherein the at least one processor is configured to cause the BS to:

identify a UE identifier (ID) of the UE based on the first TB, wherein the second DCI is scrambled with the second RNTI in response to identifying the UE ID.

9. A user equipment (UE) for wireless communication, comprising:

at least one memory; and at least one processor coupled with the at least one memory and configured to cause the UE to:

monitor at least one radio network temporary identifier (RNTI) for receiving a first downlink control information (DCI), wherein, to monitor the at least one RNTI, the at least one processor is configured to cause the UE to:

start a timer after transmitting a first transport block (TB);

monitor only a first RNTI before the timer expires; and monitor both the first RNTI and a second RNTI after the timer expires, wherein the first TB includes an RRCResumeRequest or an RRCResumeRequest1, and a buffer status report (BSR); and receive the first DCI.

10. The UE of claim 9, wherein the at least one processor is configured to cause the UE to transmit the first TB based on the first DCI.

11. The UE of claim 9, wherein to transmit the first TB is to include the first RNTI in the first TB in a form of a media access control (MAC) control element (CE).

12. The UE of claim 9, wherein the at least one RNTI are one or both of the first RNTI or the second RNTI, wherein the first RNTI is a temporary C-RNTI (TC-RNTI), and the second RNTI is a specific RNTI (S-RNTI) or a short Inactive-RNTI (shortI-RNTI).

13. The UE of claim 9, wherein the UE is configured with the first RNTI when the UE is in an RRC_CONNECTED state.

14. The UE of claim 9, wherein the timer is configured by the UE or a base station (BS), or is predefined.

15. The UE of claim 9, wherein the at least one processor is configured to cause the UE to: monitor only the first RNTI for receiving a second DCI in response to the first DCI being scrambled by the first RNTI.

16. The UE of claim 9, wherein the at least one processor is configured to cause the UE to; monitor only the second RNTI for receiving a second DCI in response to the first DCI including at least the second RNTI.

17. The UE of claim 16, wherein the first DCI is scrambled by the first RNTI.

18. The UE of claim 9, wherein the at least one processor is configured to cause the UE to stop uplink data transmission and re-initiate a random access (RA) in response to the first DCI including a third RNTI and the third RNTI does not match the second RNTI.

19. A method performed by a base station (BS), the method comprising:

scrambling a first downlink control information (DCI) with a radio network temporary identifier (RNTI);

configuring a timer;

receiving a first transport block (TB) from a user equipment (UE), wherein the first TB includes an RRCResumeRequest or an RRCResumeRequest1 and a buffer status report (BSR); and wherein the timer is started after reception of the first TB and only the first RNTI is monitored before the timer expires;

transmitting the first DCI to the UE; and scrambling a second DCI with a second RNTI based on the first TB, wherein the first RNTI and the second RNTI are monitored after the timer expires.

20. The method of claim 19, wherein the first RNTI is a temporary C-RNTI (TC-RNTI), and the second RNTI is a specific RNTI (S-RNTI) or a short Inactive-RNTI (shortI-RNTI).

* * * * *